(12) United States Patent
Costa et al.

(10) Patent No.: US 8,054,740 B2
(45) Date of Patent: Nov. 8, 2011

(54) METHOD FOR ENCODING DATA BLOCKS

(75) Inventors: Elena Costa, München (DE); Egon Schulz, München (DE); Petr Trifonov, St.-Petersburg (RU)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 294 days.

(21) Appl. No.: 11/919,872

(22) PCT Filed: Apr. 25, 2006

(86) PCT No.: PCT/EP2006/061816
§ 371 (c)(1),
(2), (4) Date: Dec. 15, 2008

(87) PCT Pub. No.: WO2006/117313
PCT Pub. Date: Nov. 9, 2006

(65) Prior Publication Data
US 2009/0147764 A1  Jun. 11, 2009

(30) Foreign Application Priority Data
May 4, 2005  (EP) .................................... 05009853

(51) Int. Cl.
H04J 11/00 (2006.01)
H04J 4/00 (2006.01)
H04J 1/00 (2006.01)
H04B 1/66 (2006.01)
H04L 1/14 (2006.01)
H03M 13/00 (2006.01)

(52) U.S. Cl. ........ 370/208; 370/436; 370/480; 455/102; 714/750

(58) Field of Classification Search ................. None
See application file for complete search history.

(56) References Cited

U.S. PATENT DOCUMENTS

| | | | |
|---|---|---|---|
| 6,167,031 A | 12/2000 | Olofsson et al. | |
| 7,016,296 B2 * | 3/2006 | Hartman, Jr. | 370/204 |
| 7,230,931 B2 * | 6/2007 | Struhsaker | 370/280 |
| 7,350,125 B2 * | 3/2008 | Jang et al. | 714/748 |
| 7,724,640 B2 * | 5/2010 | Larsson | 370/216 |
| 2003/0097623 A1 * | 5/2003 | Razavilar et al. | 714/704 |
| 2004/0151108 A1 * | 8/2004 | Blasco Claret et al. | 370/206 |
| 2005/0111345 A1 * | 5/2005 | Jacobsen et al. | 370/203 |
| 2005/0141475 A1 * | 6/2005 | Vijayan et al. | 370/345 |
| 2005/0157803 A1 * | 7/2005 | Kim et al. | 375/260 |
| 2006/0171396 A1 * | 8/2006 | Singh et al. | 370/394 |

FOREIGN PATENT DOCUMENTS

| EP | 1 096 710 A2 | 5/2001 |
|---|---|---|
| EP | 1 337 066 B1 | 1/2005 |

OTHER PUBLICATIONS

International Search Report for Application No. PCT/EP2006/061816; mailed Jul. 6, 2006.

* cited by examiner

*Primary Examiner* — Chirag Shah
*Assistant Examiner* — Ashley Shivers
(74) *Attorney, Agent, or Firm* — Staas & Halsey LLP

(57) ABSTRACT

Prior to transferring to a radio communication system, at least one data block is encoded according to predetermined quality-of-service requirements with the aid of a first code. Subsequently, the data block, encoded by the first code, is further encoded according to the radio transmission properties of a usable radio transmission source with the aid of a second code.

20 Claims, 1 Drawing Sheet

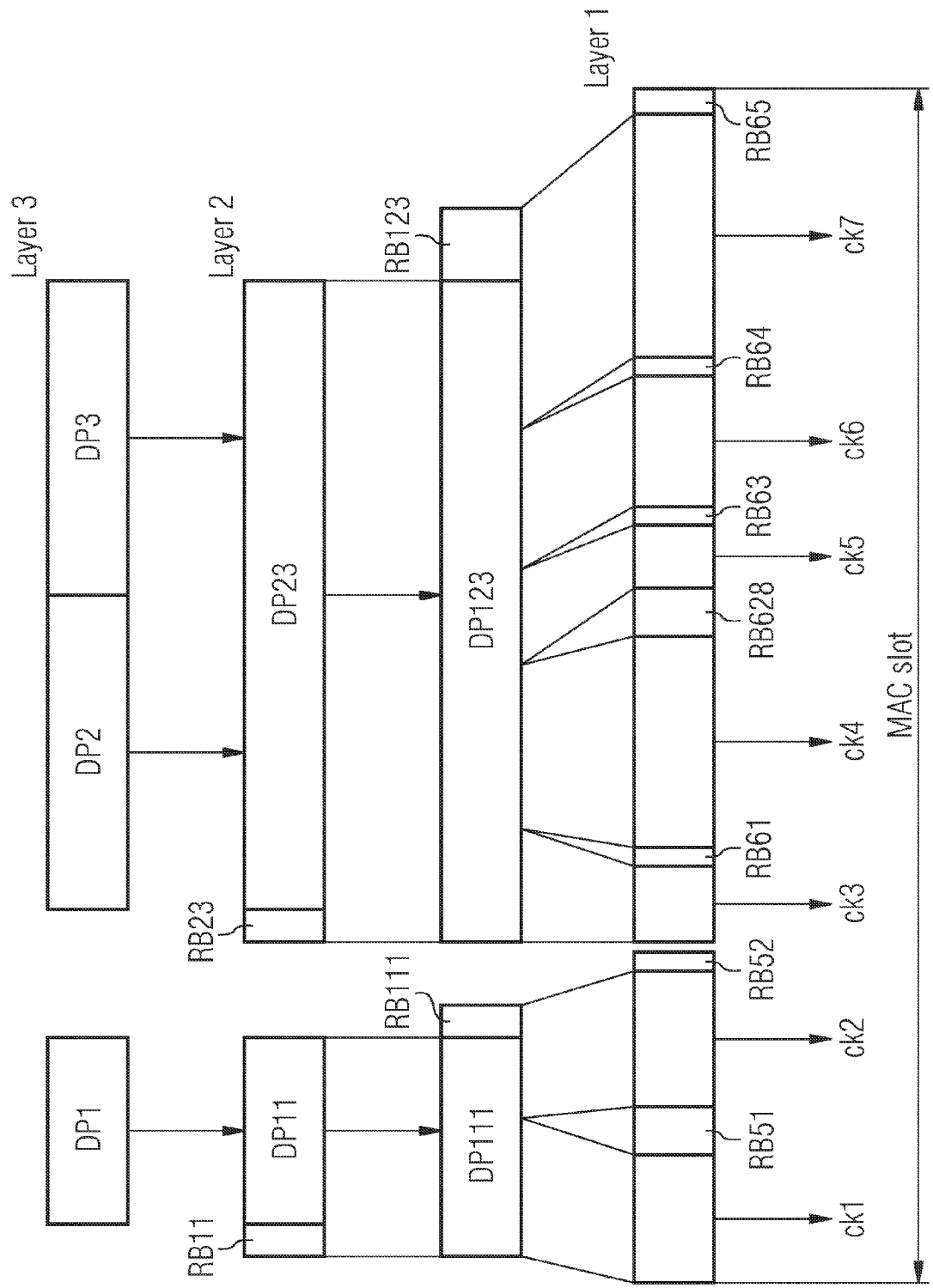

METHOD FOR ENCODING DATA BLOCKS

CROSS REFERENCE TO RELATED APPLICATIONS

This application is based on and hereby claims priority to European Application No. 05009853.2 filed on 4 May 2005, the contents of which are hereby incorporated by reference.

BACKGROUND

Described below is a method for encoding data blocks for transmission in a radio communication system.

So-called "multicarrier" transmission methods, in which a plurality of carriers are simultaneously modulated, are becoming increasingly important in third-generation and fourth-generation mobile radio networks. One typical multicarrier transmission method is the so-called "Orthogonal Frequency Division Multiplexing (OFDM)" radio transmission method in which carriers which are referred to as "subcarriers" are used to transmit symbols. A multicarrier transmission method affords the advantage of high-data-rate transmission with little receiver complexity. In addition, it is very robust to temporal fluctuations in properties of the radio transmission channel.

Radio transmission resources, which are referred to as so-called "chunks", are used in a multiplicity of radio transmission methods—thus during OFDM radio transmission as well. A "chunk" is dimensioned, on the one hand, by a number of multicarriers or subcarriers and, on the other hand, by a defined time slot which can be assigned to the multicarriers or subcarriers. For example, a plurality of adjacent subcarriers are used to dimension a "chunk".

In these methods, a limited number of bits is assigned to each radio transmission resource for the purpose of transmission. Additional control information which is concomitantly transmitted as a so-called "signaling overhead" is in turn assigned to the bits of a radio transmission resource. Such control information disadvantageously reduces a throughput of useful data which is referred to as the "payload".

The dimensions of a "chunk" are determined on the basis of properties of the radio transmission channel. The properties of the radio transmission channel are determined using channel estimation methods, for example. Depending on the properties of the radio transmission channel, a transmission power and/or selected modulation of the transmission signal is/are adapted at the transmitter end and suitable subcarriers or multicarriers are selected.

A "chunk" under consideration is advantageously dimensioned with regard to so-called "flat fading" in the frequency domain and a constant temporal behavior in the time domain. The dimensioning makes it possible to adapt the radio transmission to be carried out to the properties of the radio transmission channel in an adaptive manner.

So-called "quality of service (QoS)" requirements which depend on wishes and selected services of a subscriber must also be complied with during radio transmission.

Encoding methods or error correction codes are used to adapt the radio transmission to the properties of the radio transmission channel in an adaptive manner and to meet the QoS requirements. In this case, a throughput of useful data which can be achieved depends on the encoding method used since a large number of redundancy bits must be transmitted, for example, in the case of very secure data transmission with a complex error correction code.

If a so-called "turbocode (TC)" or a so-called "Low Density Parity Check Code (LDPC)" is used, for example, for encoding, a relatively long code sequence is required for good-quality transmission.

If low-level modulation, for example BSPSK modulation, is used during OFDM radio transmission, only a maximum number of 64 bits per "chunk" can thus be transmitted.

As regards this maximum number of bits, a short code sequence could be used to encode the bits but this could result in a loss of data during transmission.

If, in contrast, a long code sequence is intended to be used and the encoded bits are then divided among the "chunks", a suitable code length for respective modulation operations could be found only with difficulty. Independent adaptation of encoding, on the one hand, and modulation which can be set in an adaptive manner, on the other hand, are possible only with difficulty for desired optimum transmission of useful data.

For the purpose of encoding, a number of error correction codes with different code lengths are typically provided and a compromise is made between the possibility of correcting errors, on the one hand, and delays when transmitting the useful data as part of the QoS requirements, on the other hand. Data blocks are then encoded and are mapped to, or divided among, available "chunks".

SUMMARY

Therefore, described below is a method for encoding data blocks which are intended to be transmitted in a radio communication system using a multicarrier transmission method, in which the encoding operation, on the one hand, and the operation of adapting the radio transmission to the properties of the radio transmission channel, on the other hand, can be set in an optimized manner.

In the method described below, data blocks are encrypted or encoded using a first, "external" code on the basis of predefined quality of service requirements during a so-called "external" encoding operation.

The data blocks which have been encrypted using the external code are then encrypted or encoded again using a second, "internal" code during a so-called "internal" encoding operation. This second encoding operation is carried out on the basis of properties or radio channel properties of those "chunks" which are intended to be used for transmission.

The external encoding operation is preferably carried out in a layer 2 which is referred to as the "link layer", and the internal encoding operation is preferably carried out in a layer 1 which is referred to as the "physical layer".

The external encoding operation is preferably carried out using an error correction code whose code lengths and code rate can be set in a flexible manner. The setting operation is carried out in a manner adapted to the respective length and to error correction requirements of a layer 2 data block or data packet.

The internal encoding operation is preferably carried out on the basis of selected modulation which is used for radio transmission. For example, so-called "coset code" or "trellis code" modulation could thus be used.

As a result of the method described below, a code rate for each "chunk" is optimally approximated to the properties of radio transmission channels or "chunks" in an adaptive manner.

BRIEF DESCRIPTION OF THE DRAWINGS

These and other aspects and advantages will become more apparent and more readily appreciated from the following description of the exemplary embodiments, taken in conjunction with the accompanying drawing of which:

FIG. 1 shows the method using three data packets or data blocks DP1, DP2 and DP3 of an OFDM radio communication system.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Two data blocks DP2 and DP3 of a layer 3 are combined, in layer 2, to form one data block DP23 as a link layer data block, while the data block DP1 of layer 3 passes to layer 2 as the data block DP11.

The data block DP11 has a header RB11 and the data block DP23 has a header RB23, each header RB11, RB23 including a respective CRC code and control information.

The data block DP11 is supplied, together with the header RB11, to an external encoding operation, while the data block DP23 is supplied, together with the header RB23, to an external encoding operation. The external encoding operation is selected taking into account a quality of service requirement and a selected traffic class.

A trivial error correction code could also be used, for example, for the external encoding operation if the code length assigned to a "chunk" is suitable for meeting the error correction requirements of a data packet under consideration.

As a result of the external encoding operation, a new data block DP111 which has redundancy bits inside a region RB111 is formed from the data block DP11 and the header RB11. Also as a result of the external encoding operation, a new data block DP123 which has redundancy bits inside a region RB123 is formed from the data block DP23 and the header RB23.

The data block DP111 and its redundancy region RB111 are supplied to a division operation and to an internal encoding operation, the latter being carried out on the basis of the properties of the radio transmission resources, "chunks" ck1 and ck2, to be used. In this case, further redundancy bits arise in regions RB51 and RB52.

The data block DP123 and its redundancy region RB123 are supplied to a division operation and to an internal encoding operation, the latter being carried out on the basis of the properties of the radio transmission resources, "chunks" ck3 to ck7, to be used. In this case, further redundancy bits arise in regions RB61 to RB65.

Modulation and mapping to the respective carrier frequencies or subcarriers are finally carried out on the basis of properties of the radio transmission channel.

In the case of OFDM radio transmission, soft-output decoding of the "internal" code is carried out at the receiver end. The soft-output information is dispensed with for those "chunks" which have a complete layer 2 data packet. Hard-decision values are retained, layer 2 headers are verified and the payload data or useful data formed are transmitted to the network layer.

For those "chunks" which have only part of a layer 2 data packet, the soft-output information is collected and is used to decode the external code. Following successful decoding of the external code, the layer 2 header is verified. The payload data are then transferred to the network layer.

In an advantageous development, three methods for an "Automatic Repeat Request (ARQ)" are described below. In a first ARQ method, only the incorrectly decoded code words of the internal code are transmitted again. In a second ARQ method, additional check bits which were generated for the external code are encoded and concomitantly transmitted together with the internal code. In a third ARQ method, the entire code word is transmitted again.

With reference to FIG. 1, this is, for example, the code word which is assigned to the "chunks" ck1 and ck2 or the code word which is assigned to the "chunks" ck3 to ck7.

The method is used to carry out joint implementation of functions of a physical layer and a link layer and to realize adaptive transmission.

Short data packets which require short transmission times are encoded and transmitted using only the internal code; it is then possible to dispense with the external encoding operation.

In contrast, longer data packets are first of all encrypted using the external code and the code word is transmitted in such a manner that it is divided among a plurality of "chunks" in order to realize better error protection. Adaptation to the radio transmission channel or its properties is carried out using the internal code.

In one advantageous development, a radio transmission resource or "chunk" is used by at least two subscribers and is thus assigned to these subscribers. In this case, the subscribers can be distinguished, for example, using different CDMA codes or different encoding.

In one advantageous development, the first and/or second code can be set or selected by a subscriber as part of the quality of service requirements. For this purpose, the subscriber is advantageously offered a suitable combination of the first and second codes.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for encoding data blocks for radio transmission in a radio communication system, in which a multicarrier, orthogonal frequency division multiplexing transmission method with a plurality of subcarriers is used, with adjacent subcarriers being used to dimension a radio transmission resource, comprising:
    encoding in a link layer at least one data block using a first code based on predefined quality of service requirements to produce at least one encoded data block;
    encoding in a physical layer the at least one encoded data block using a second code based on radio transmission properties of the radio transmission resource provided for transmission, and
    encoding and transmitting check bits which were generated for the first code together with the second code as part of an ARQ method; and
    wherein the quality of service requirements depend on selected services of a subscriber.

2. The method as claimed in claim 1, wherein the radio transmission resource is dimensioned, on the one hand, by subcarriers and, on another hand, by a time slot which can be assigned to the subcarriers.

3. The method as claimed in claim 2, further comprising setting at least one of a code length and a code rate of an error correction code in a flexible manner adapted to a respective length and to error correction requirements of a link layer data block, and
wherein the error correction code is used for the first encoding operation.

4. The method as claimed in claim 3, further comprising setting at least one of the first and second codes by a subscriber as part of the quality of service requirements.

5. The method as claimed in claim 4, wherein said encoding in the physical layer is carried out based on selected modulation of the multicarrier, orthogonal frequency division multiplexing transmission method.

6. The method as claimed in claim 5,
wherein said encoding in the physical layer results in a further encoded data block, and
wherein said method further comprises dividing the further encoded data block among a number of radio transmission resources to be used.

7. The method as claimed in claim 6, further comprising assembling the data block in the link layer from a plurality of data blocks of a layer 3, prior to said encoding in the link layer.

8. The method as claimed in claim 7, further comprising retransmitting as part of an ARQ method only incorrectly decoded code words of the second code.

9. The method as claimed in claim 7, further comprising retransmitting an entire code word which has been divided among the radio transmission resources as part of an ARQ method.

10. The method as claimed in claim 7, wherein a radio transmission resource is assigned to at least two subscribers which can be distinguished using different encoding.

11. A radio communication system for encoding data blocks for radio transmission, in which a multicarrier, orthogonal frequency division multiplexing transmission method with a plurality of subcarriers is used, with adjacent subcarriers being used to dimension a radio transmission resource, comprising:
the radio communication system configured to implement an operation including:
encoding in a link layer at least one data block using a first code based on predefined quality of service requirements to produce at least one encoded data block;
encoding in a physical layer the at least one encoded data block using a second code based on radio transmission properties of the radio transmission resource provided for transmission, and
encoding and transmitting check bits which were generated for the first code together with the second code as part of an ARQ method; and
wherein the quality of service requirements depend on selected services of a subscriber.

12. The system as claimed in claim 11, wherein the radio transmission resource is dimensioned, on the one hand, by subcarriers and, on another hand, by a time slot which can be assigned to the subcarriers.

13. The system as claimed in claim 12, wherein at least one of a code length and a code rate of an error correction code is set in a flexible manner adapted to a respective length and to error correction requirements of a link layer data block, and
wherein the error correction code is used by said encoding in the link layer.

14. The system as claimed in claim 13, wherein at least one of the first and second codes is set by a subscriber as part of the quality of service requirements.

15. The system as claimed in claim 14, wherein said encoding in the physical layer is carried out based on selected modulation of the multicarrier, orthogonal frequency division multiplexing transmission method.

16. The system as claimed in claim 15, wherein said encoding in the physical layer produces a further encoded data block, and
wherein said system further comprises dividing the further encoded data block among a number of radio transmission resources to be used.

17. The system as claimed in claim 16, wherein the operation includes assembling the data block in the link layer from a plurality of data blocks of a layer 3, prior to the encoding in the link layer.

18. The system as claimed in claim 17, wherein the operation includes retransmitting as part of an ARQ method only incorrectly decoded words of the second code.

19. The system as claimed in claim 17, wherein the operation includes retransmitting an entire code word which has been divided among the radio transmission resources as part of an ARQ method.

20. The system as claimed in claim 17, wherein a radio transmission resource is assigned to at least two subscribers which can be distinguished using different encoding.

* * * * *

UNITED STATES PATENT AND TRADEMARK OFFICE
CERTIFICATE OF CORRECTION

| | | |
|---|---|---|
| PATENT NO. | : 8,054,740 B2 | Page 1 of 1 |
| APPLICATION NO. | : 11/919872 | |
| DATED | : November 8, 2011 | |
| INVENTOR(S) | : Elena Costa et al. | |

It is certified that error appears in the above-identified patent and that said Letters Patent is hereby corrected as shown below:

Column 6, Line 39, In Claim 18, delete "words" and insert -- code words --, therefor.

Signed and Sealed this
Thirty-first Day of January, 2012

David J. Kappos
*Director of the United States Patent and Trademark Office*